Patented May 12, 1936

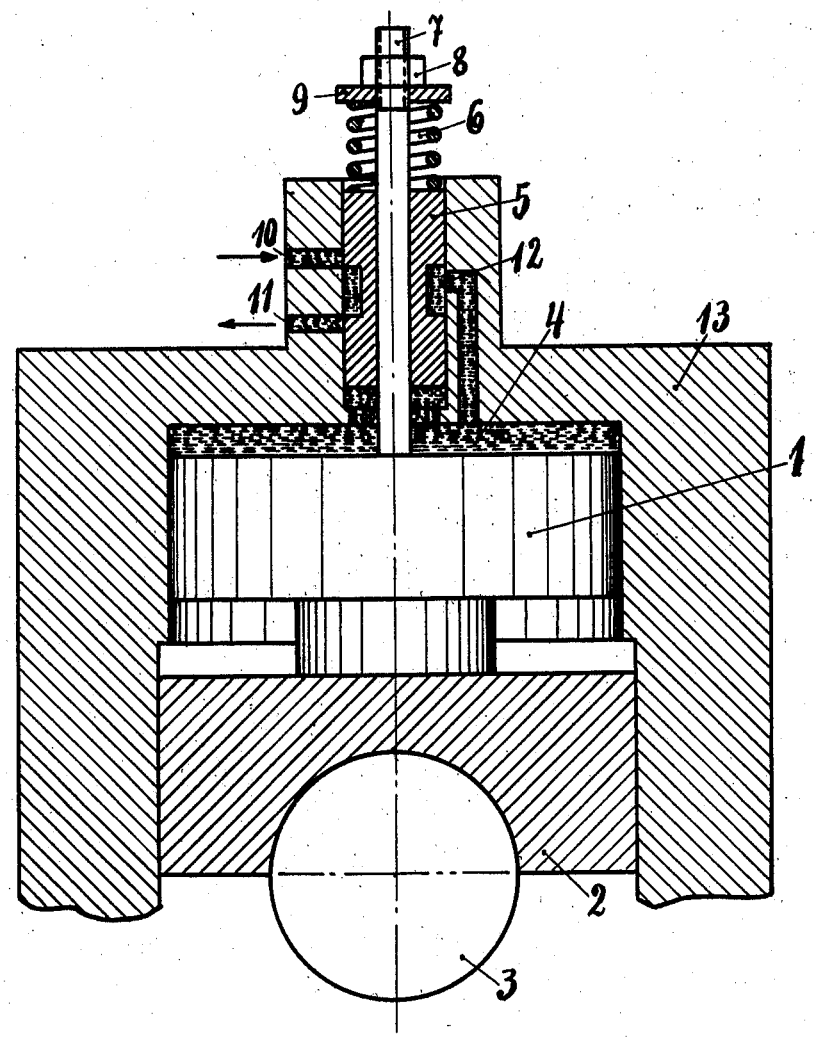

2,040,755

UNITED STATES PATENT OFFICE 2,040,755

REGULATING MEANS FOR ROLLING MECHANISMS

Eduard Meyer, Mulheim, Germany

Application May 13, 1935, Serial No. 21,279
In Germany May 8, 1934

2 Claims. (Cl. 80—56)

This invention relates to rolling mechanisms, and more particularly to means permitting automatically of relative adjustment of the rolls dependent on the pressure.

It is the primary object of the invention to compensate differences in size of the article being rolled arising from variations in the rolling pressure, so that the finished product will always possess the desired measurements.

Additional objects and advantages of the invention will become apparent as the description proceeds.

In carrying the invention into effect I make use of the variable rolling pressure as impulse for the regulation.

As a measure for the regulation there may be employed the initial tension of a regulating spring, which is varied in certain and positive fashion by means of a piston dependent on the position of this piston. In this way a particular rolling pressure is adjusted automatically in respect of each and every position of the said piston.

The invention will now be described with reference to the accompanying drawing, which constitutes a part of the invention and illustrates in section a form of embodiment of a regulating device for regulating the rolling pressure in accordance with the relative position of the rolls.

In the drawing, I is a piston, which acts through the medium of a bearing 2 on the trunnion 3 of the roll. The liquid 4 acts against the piston I and the lower end of the regulating plunger 5.

In opposition to the pressure of the liquid 4 there acts on the plunger 5 a regulating spring 6, which is tensioned by the piston I through the medium of the rod 7, the nut 8 and the disk 9. The rod 7 is connected firmly with the piston I, while the plunger 5 is able to move quite freely on this rod. The intake for the liquid is shown at 10, and the outlet at 11. Through the passage 12 the liquid is able to flow to and from the pressure cylinder firmly connected with the housing frame 13.

The operation of the device is as follows:

If the rolling pressure associated with a given position of the piston I is too high, the plunger 5 is forced upwards and opens the passage 10. The piston I is pressed downwards for such time until the pressure of the liquid and the pressure of the spring 6 attain a state of equilibrium and the inflow of liquid through 10 is again blocked. The reverse form of regulation takes place when the rolling pressure is too small in a given position of the piston I, in which case the pressure of the spring outweighs the pressure of the liquid and the plunger 5 is forced downwards, opening the passage 11, so that the piston I is able to move upwards. The stationary condition, i. e., the correct rolling pressure, is again attained by compensation between the tension of the spring 6 and the pressure of the liquid in the zero position of the plunger 5, i. e., the position in which liquid is unable to pass either to or from the cylinder via the plunger 5.

The regulation in respect of any position of the piston is such that in the case of excessive pressure the rolls are moved together, or if the pressure is too small they are moved apart. In this connection the plunger 5 is moved into the zero position, in which liquid is unable to flow to and from the pressure cylinder.

The rolls are moved together when the rolling pressure is excessive for the particular position of the rolls, as this excessive pressure causes the pass to be increased owing to the yielding nature of the frame. This, therefore, is again compensated by moving the rolls together.

The apparatus as described is used without ordinary screw downs. The rolling pressure is taken up by the pressure liquid by way of the piston I. The first adjustment is performed by displacing the nut 8. In this connection the plunger 5, which is freely movable on the rod 7, retains in its zero position the same location in relation to the frame, whilst the piston I is moved upwards or downwards dependent on the adjustment of the nut 8. This adjustment is made for a certain pass, and the apparatus then performs regulation of the pass automatically, that is to say—it maintains a constant pass and accordingly a constant product.

The piston I assumes for the new pressure a new position. The initial tension of the spring 6, i. e., the tension of the spring in the zero position of the plunger 5, is determined by the distance between the upper end of the plunger 5 and the disk 9. Since the plunger 5 has a zero position which is invariable, the initial tension of the spring 6 in respect of the zero position of the plunger 5 must necessarily alter together with the new position of the piston I, as the position of the disk 9 in relation to the upper end of the plunger is also changed.

In other words, the initial tension of the spring, i. e., the tension thereof in the zero position of the plunger 5, does not remain constant, but varies together with the piston I, in such a way that when the piston is forced downwards the initial tension is increased, and when the piston moves upwards it is reduced. This coincides with the whole idea of the regulation, which is to provide for compensation in the difference in pass occasioned by different rolling pressures. As the rolling pressure increases the expansion in the frame causes the pass also to be increased, and the rolls are then moved together. If the rolling pressure decreases, the position is exactly vice versa. Since the rolling pressure is the primary factor, it may be said that for each rolling pressure there is adjusted automatically a certain position of the piston, to which in turn there also belongs a certain initial tension of the spring.

It will be understood that no limitation is made to the particular form of embodiment illustrated in the drawing, which has been quoted merely by way of example, and that various modifications are quite possible within the meaning of the above description and the annexed claims without departing from the spirit of the invention.

The drawing illustrates regulating means for the one end of the rollers, and regulation may also be performed at the opposite end in exactly similar fashion. The principle of the invention, however, is not varied if regulation is performed at one end only.

What I claim as new and desire to secure by Letters Patent is:

1. In a device for the automatic relative adjustment of the rollers of a rolling mechanism, a cylinder, a piston in the said cylinder governed by the rolling pressure of the said rollers, a piston rod, a plunger slidable on the said piston rod, means for applying pressure to the said piston and the said plunger, and means for applying a counter-pressure to the said plunger dependent on the pressure exerted by the said rollers on the said piston.

2. In a device for the automatic relative adjustment of the rollers of a rolling mechanism, a cylinder, a piston in the said cylinder governed by the rolling pressure of the said rollers, a piston rod, a plunger adapted to slide on the said piston rod, inlet and outlet ports governed by the said plunger for a pressure liquid introduced between the said piston and the said plunger, and a spring acting on the said plunger in opposition to the said pressure liquid, the initial tension of the said spring varying dependent on the position of the said piston.

EDUARD MEYER.